BEST AVAILABLE COPY
Lafayette Stevens.
Boring Machine.
No. 3133
Reissued Sep. 22, 1868.
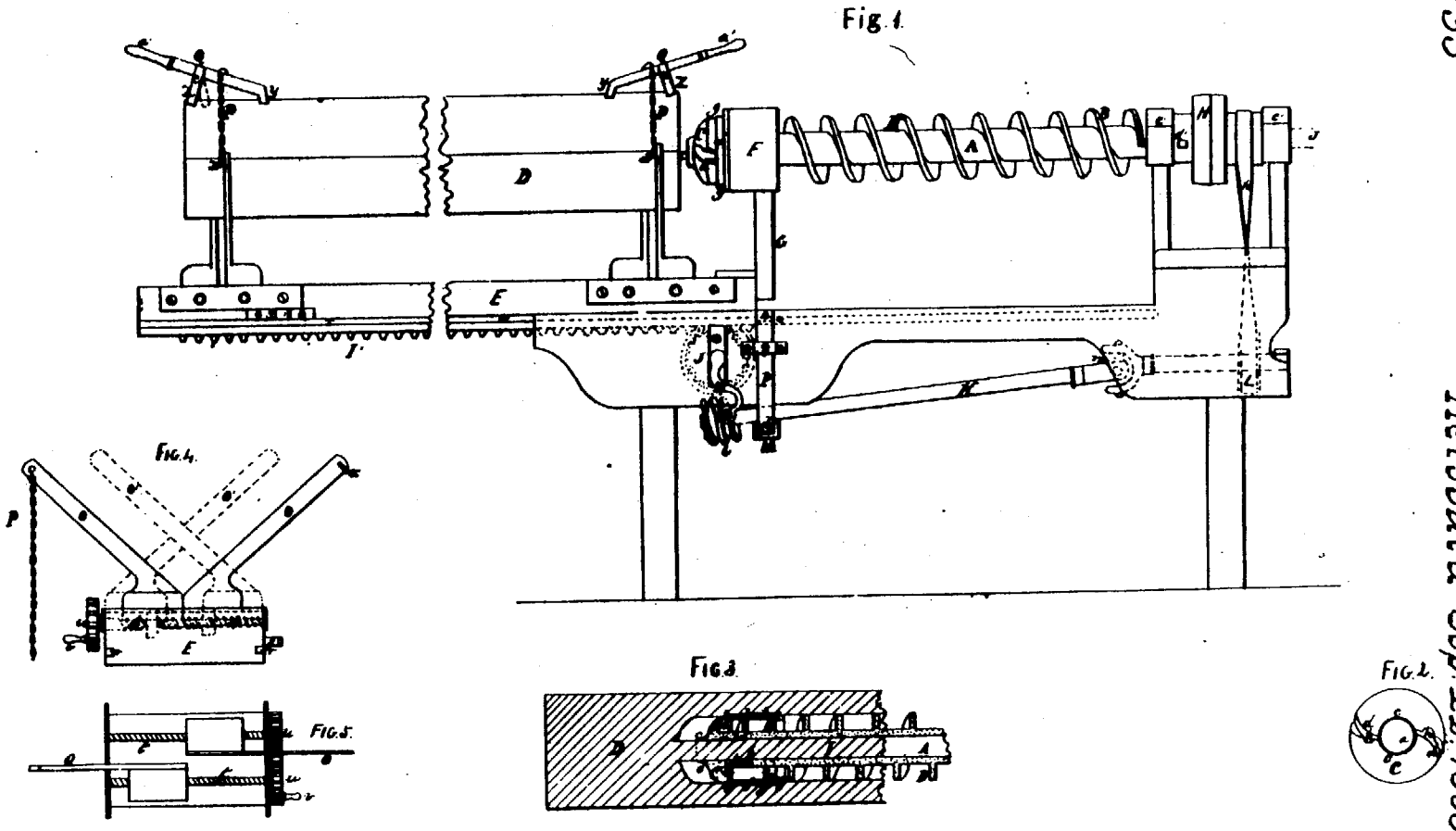

BEST AVAILABLE COPY

United States Patent Office.

ARCALOUS WYCKOFF, OF ELMIRA, NEW YORK, ASSIGNEE, BY MESNE ASSIGNMENTS, OF LA FAYETTE STEVENS, OF SAME PLACE.

*Letters Patent No.* 18,872, *dated December* 15, 1857; *reissue No.* 3,133, *dated September* 22, 1868.

IMPROVEMENT IN BORING-MACHINES.

The Schedule referred to in these Letters Patent and making part of the same.

TO ALL WHOM IT MAY CONCERN:

Be it known that LA FAYETTE STEVENS, of Elmira, in the county of Chemung, and State of New York, has invented a new and useful Improvement in Boring-Machines; and I do hereby declare the following to be a full, clear, and exact description of the construction and operation of the same, reference being had to the annexed drawings, making part of this specification, and to the letters of reference marked thereon.

The same letters refer to like parts.

Figure 1 is a longitudinal elevation of the machine.

The form of the auger is annular. In place of a shaft or stock, a metallic tube is employed, which is represented at A, fig. 1. A piece of gas-pipe, of the requisite size, and turned smooth, answers this purpose very well. It may be of any length which it is desired to bore. It is wound spirally, its whole length, with a flat wire or worm, B, which is brazed or otherwise permanently attached to its exterior surface.

The cutter-head C, shown in front elevation at Figure 2, is annular, like the body of the auger, having an aperture, *a*, through its centre, corresponding with the bore of the tube. It is attached to the tube by a screw cut in the end of the tube *b b*, Figure 3. An annular spur, *c c*, having a thin, knife-edge, surrounds the opening, *a*, in the cutter-head. This is termed the leading spur, as it projects one-eighth of an inch, or thereabouts, in advance of the auger, and serves an important office, both in centring and guiding it. The cutters *d d* start from the spur *c*, and extend back, in a curved and oblique line, to the shoulder of the head, so as to act upon the grain of the wood with an oblique stroke, the edge of the cutter projecting in the direction of the revolution of the cutter-head.

Immediately back of the cutter-head is a collar, consisting of a thin ring, *f*, of about two inches in width, or more or less, as the diameter requires, of the same external diameter as the cutter-head. The worm is turned down to receive it, at *e e*, fig. 3, which is a longitudinal section of the head or cutting-end of the auger.

The spiral flange B is intended to carry away the shavings as the wood is cut away by the bit. As the shavings must pass through an opening of less area than the kerf from which they are cut, in order that they may be removed, it is necessary that the pitch of the spiral flange should be great enough to move them faster than the feed, but it should not be so great as to carry them around with the revolution of the auger, as in that case they would be liable to wedge and clog the action of the auger. It is preferred to have a pitch about equal to the diameter of the bore. The length of the pitch may be greater where the auger revolves at a very high speed, or where it bores but a short distance into the wood; but the practical limits, in any given case, are in one direction, the removal of the chips as formed, and in the other, that they shall not be unnecessarily carried around by the flange, so as to clog the auger.

Two minute knife-edges are placed longitudinally, and upon the outside of the collar *g g*, fig. 1. Within this collar, and for its length, there is a double worm, instead of a single one, corresponding with the two cutting-knives in the head. The chips pass through the throats *h h*, and are immediately caught in the worm and carried back by its revolutions.

D represents the timber to be bored; E, the carriage by which it is held and fed to the auger. F is a support or rest for the auger until it has entered the wood, it being attached to the carriage by the standard G, and consequently moves with it as the timber is fed up. H is the band-pulley by which the auger is driven.

The auger being put in motion, the operation is this: The spur *c* at once enters the wood, and forms, as it were, a bearing for the auger, steadying and directing it. If the end of the timber is not exactly at right angles with its sides, as is very liable to be the case, the auger would, by first meeting with resistance on one side of its centre, be deflected somewhat, or turned aside from its true course, but the leading spur entirely prevents this, for, having once entered the wood, the auger must inevitably follow its course, and that with the steady, mechanical action necessary to insure smooth and straight boring.

BEST AVAILABLE COPY

The collar *f* is held stationary by two grooves in the supporting-box F, which receives the knife-edges *g g*, and thus prevents its revolving with the auger. As it enters the wood, the knife-edges bury themselves in the wood or periphery of the bore, and thus prevent the collar from turning in its passage through. Thus it acts as a journal-box for the head of the auger at all times, when in operation. It is constructed of or lined with a softer metal, so as to prevent too much friction. A shoulder is turned on the cutter-head *c c*, and a ring, with a similar shoulder, *i i*, is attached to the worm, which gives it an equal bearing at each end. Very slight force is required to drive forward this stationary collar, as the knife-edges are sharp, and of little projection, leaving only a mere scratch in the wood as they pass.

The auger removes only an annular portion of the wood, or that in the periphery of the bore, leaving the central part as a core or rod, which passes through the hollow of the tube A, and is discharged at the end of the auger, *j*, fig. 1, in the form of a smoothly-turned rod, as seen at I, fig. 3. Thus a considerable portion of the power is saved, and a portion of the timber is left ready finished, for a variety of useful purposes, such as rollers, rods, pickets, and handles for various purposes.

The core serves an important part in directing the auger in its straightforward course. The opening through the cutter-head is slightly smaller than the bore of the tube, which gives the core free passage through the tube, without friction. But being led by the spur *c*, and the cutters followed by the collar *f*, closely fitting the interior of the bore, and the cutter-head fitting tightly to the core from C′ to *b*′, fig. 3, the bearing is so ample, and so aptly adjusted, that it entirely overcomes any tendency to diverge from a straight course, which extraneous influences might exert on the auger. The collar also effectually prevents the vibrations which must otherwise occur in a long auger when it has bored through the timber—vibrations which are very injurious to the symmetry of the hole bored.

Underneath the carriage is a cog-rack, I′, into which gears the pinion J, (shown in dotted lines through the frame.) This pinion is driven by a worm, *l*, on the adjustable shaft K, which shaft is operated by the pulley L, which is run by the band *k* from the shaft of the auger. A bail-joint, *m*, allows the shaft K to fall, so as to throw the worm *l* out of gear with pinion J, as shown in the drawing. The shaft K hangs upon a movable bearing, M. To throw it into gear, it is only necessary for the operator to raise the handle *n*, until a hook, at *o*, takes hold of the top of the frame and supports it. This hook is upon the end of a flexible metallic strap, *p*, which is griped by the clamp *q*, so as to keep it pressed closely to the frame, and the moment it is sufficiently raised it springs to its place, and secures the shaft K in the position to give the free motion to the carriage when the auger is put in operation. The carriage slides on ways which fit the grooves *r r*. These ways must be in a direct line with the auger. At the moment the timber is bored through, a small side-plate, S, in the carriage, having a wedge-shaped projection, strikes the point of the hook *o*, and crowds it off of its bearing, so as to stop the feed at once. This obviates any trouble that might arise from the neglect or oversight of the operator.

The carriage is then run back by the crank N, and is in readiness for another timber. For adjusting the timber on the carriage, there is employed a pair of oblique rests, O O, Figure 4, having an inclination of forty-five degrees. These are movable upon ways across the carriage, being attached underneath the ways to a pair of screws, *t t*. Upon the ends of these screws is a pair of pinions, *u u*, geared together. By turning the handle *v*, the screws are revolved in opposite directions, by means of which the rests O O are drawn by each other, raising their angle of coincidence, as shown at O′ O′, or lowering it at pleasure. A pair of these rests may be placed at each end, and, if necessary, one may be used in the middle. To secure the timber in the rest, attach a chain, P, to one of these rests, which is passed over the timber, and hooked to the other at *x*, fig. 1. The chain being somewhat loose, raise it, and pass the point *y* of the dog Q under it. This point has a notch which fits the angle or ridge of the timber. A fulcrum-post, *z*, is attached by a movable joint, about midway of the log, and by raising the lever-handle *a*′, and at the same time crowding the post under, the timber is griped and held with great force.

The construction of the auger is peculiarly adapted to boring large-sized tubing for water-conductors, &c., and for economizing power in boring holes of any size, large or small. In boring large holes, a greater saving of timber, and consequently of power, is effected, as the depth of the annular bore diminishes in a certain geometrical ratio, as the diameter of the auger increases. This is explained by the fact that the greater circumference gives an increase in the width of the grooves or meshes of the worm, which compensates for the lesser depth, and yet secures ample room for the discharge of the chips. The same width of the annular cut required to produce a two-inch hole, may be used for all sizes above and below it.

The auger is attached to the shaft of the driving-pulley H by sliding into a socket in the same, where it is secured by the set-screw *d*′. This shaft has its bearings in the two boxes *c*′ *c*′, and is hollow, like the auger, to admit of the core being discharged through it. In boring large-sized tubing, the core may be used again for a smaller size, and the core left from that may still be employed for many useful purposes.

The hollow cylindrical stock of an auger is not claimed; but

What is claimed as the invention of the said La Fayette Stevens, and desired to be secured by Letters Patent, is—

1. The oblique traversing-rests O O, in combination with the screws *t t* and pinions *u u*, when arranged in relation to one another, and used in connection with the dog Q and chain P, for the purpose of adjusting the timber to the auger, and holding it firmly, substantially as set forth.

2. The combination of the shaft of the auger, the belt *k*, the shaft K, worm *l*, pinion J, and rack I′, arranged to operate the traversing-bed E, substantially as set forth.

3. An annular auger-cutter-head, the cutting-lips of which project in the direction of its rotation, and are formed on a curved and oblique line, substantially as set forth.

BEST AVAILABLE COPY

4. The loose independent collar *f*, provided with knife-edges *g g*, to keep it from turning, for the purpose f furnishing a bearing for the head of the auger while in operation.

5. The sharp annular spur *c*, for the purpose of centring and guiding the auger, and at the same time leaving a core of the material bored in the centre of the auger, in the manner specified.

In testimony whereof, I have signed my name to this specification before two subscribing witnesses.

A. WYCKOFF.

Witnesses:

JOHN S. HOLLINGSHEAD,

JOHN D. BLOOR.